Patented Aug. 4, 1942

2,291,735

UNITED STATES PATENT OFFICE 2,291,735

ANTISEPTIC

Marlin T. Leffler, Lake Bluff, Ill., assignor to Abbott Laboratories, North Chicago, Ill., a corporation of Illinois No Drawing. Application December 5, 1938, Serial No. 244,038

5 Claims. (Cl. 167—72)

The present invention relates to mild antiseptic compositions and more particularly to antiseptic compositions containing colloidal silver bromide and acacia.

Prior to the present invention silver iodide and silver chloride colloidal compositions have been described and suggested for use as antiseptic agents. While these prior colloidal silver halides are admittedly of value they have been found to possess disadvantages. For example, prior compositions have been found to have a poor penetrating action coupled with a relatively low bacteriostatic effect. In addition, the prior compositions have been found to be unsatisfactory for certain applications, e. g. colloidal silver iodide dispersed in gelatin loses its antiseptic activity in the presence of blood serum.

I have discovered that colloidal silver bromide is a particularly potent mild antiseptic. I have also discovered that colloidal silver bromide dispersed in acacia forms an antiseptic composition having a good penetrating action coupled with a relatively high bacteriostatic effect or inhibiting action. Of great importance, I have also discovered that the colloidal silver bromide-acacia composition of the present invention preserves its antiseptic activity in the presence of blood serum.

The colloidal silver bromide-acacia compositions of the present invention may be prepared by one of two general methods. Method I calls for the reduction of silver ions in the presence of an acacia solution to colloidal silver, followed by bromination in the presence of acacia to convert the metallic silver to colloidal silver bromide. Method II calls for a double decomposition reaction in the presence of an acacia solution between silver and bromide ions, followed by bromination in the presence of acacia. The preferred methods described in detail are as follows:

Method I

The acacia solution may be prepared by dissolving 2.53 pounds of acacia tears in 11 pounds of distilled water, the solution being subjected to a heat treatment of about 80° C. for approximately 1 hour. The solution is then centrifuged until free from foreign particles. The colloidal silver-acacia composition may be prepared as follows: About 4.65 liters of the above centrifuged acacia solution is placed in a 5 gallon stoneware crock and to this is added, with stirring, a filtered solution of 0.5984 pound of silver nitrate dissolved in 3.3 pounds of distilled water. About 0.377 pound of filtered 40 percent formalin is next added and after thoroughly mixing the reaction mixture, a filtered solution of 0.22 pound of potassium hydroxide dissolved in 6.6 pounds of distilled water is then added dropwise accompanied by vigorous agitation. The addition of the potassium hydroxide requires about two hours and the stirring should be continued for about one-half hour thereafter.

About 25 pounds of absolute methanol is then added to the reaction mixture with continued agitation. The agitation e. g. stirring, is continued for about ten minutes, after which the silver-acacia colloid is allowed to settle and is partially separated from the supernatant liquid by decantation. The precipitate is next centrifuged, washed thoroughly in the centrifuge with 70 percent methanol, resuspended in about 7 pounds of absolute methanol and allowed to stand for several hours. The silver-acacia solid is then separated, whipped as dry as possible in a centrifuge and finally placed on enamel trays in a hot air drier at 120° F. The yield of dried colloidal material is approximately 2.42 pounds.

The colloidal silver bromide-acacia composition may be prepared as follows: The silver-acacia product (2.42 pounds) described above is dispersed in 11 pounds of warm distilled water and the resulting solution filtered and cooled to room temperature. The filtrate is then placed in a 5 gallon stoneware crock equipped with a wooden stirrer and a non-metallic diffusion cell and brominated (with agitation) through the diffusion cell by means of bromine-laden air in the usual manner. After all the silver colloid has been converted to colloidal silver bromide (ordinarily in about 5–6 hours) and the pH is about 3.3, clean air is passed through the diffusion cell for a few minutes to carry out excess bromine. The pH of the reaction mixture is then accurately (e. g. by means of a glass electrode) adjusted to 5.0 with a 15 percent potassium hydroxide solution. The colloidal silver bromide is sensitive to light and should be handled in the absence of strong light.

The brominated colloid is precipitated by stirring with 22 pounds of 95 percent alcohol, and after standing for several hours is separated from the liquid by decantation and centrifuging in usual manner. The precipitate is next washed in the centrifuge with 70 percent alcohol, re-suspended in 11 pounds of methanol and allowed to dehydrate for 2 to 3 hours. After a final centrifuging the solid silver bromide-acacia colloid is dried in an air drier at 120° F. The dried material (moisture less than 5 percent; silver bromide content approximately 25 percent) is ball milled and screened (60 mesh) and is then ready to be mixed with the diluent hereinafter described.

Method II

The acacia solution may be prepared by the same general procedure outlined in Method I, using 1150 grams of acacia per 5 liters of distilled water. About 4.65 liters of the acacia solution is placed in a 5 gallon stoneware crock equipped with a wooden agitator and diffusion cell as in Method I. To the agitated acacia solution is then added simultaneously and dropwise, filtered solutions of 272 grams of silver nitrate dissolved in 3 liters of distilled water and 202 grams of potassium bromide dissolved in 3 liters of distilled water. The potassium bromide solution should be introduced through a capillary tube reaching to the bottom of the reaction mixture and its addition rate should be kept slightly ahead of that of the silver nitrate solution, the entire process being carried out in the absence of strong light.

After the addition of the two solutions and the reaction mixture has been allowed to stir for about one-half hour, bromine laden air is passed through the diffusion cell until the pH reaches about 3.4. Excess bromine is then removed by diffusion with pure air and the pH accurately adjusted with 15 percent potassium hydroxide to 5.0 as in Method I. The solid silver bromide-acacia colloid is also precipitated, purified, dried and prepared for use as described in Method I.

The antiseptic solutions are ordinarily prepared by dissolving the purified product obtained by one of the above methods in distilled water.

It was found, however, that concentrated aqueous solutions of the colloidal silver bromide-acacia composition (e. g. containing 25 percent or more) obtained by Methods I or II exhibited viscosities unfavorable for practical use. After a considerable research investigation, I discovered that the colloidal silver bromide-acacia powder on being mixed with certain diluents dissolves more readily and that strong solutions thereof retain their desired antiseptic effect and have viscosities well within the limit of practical usability. While the diluents may be used in various amounts e. g. 20–50 percent, it was found that the preferred percentage of diluent is around 35 percent which gives the complete composition a silver bromide percentage of approximately 16 percent and an acacia percentage of approximately 49 percent.

The diluents possessing the proper physical and chemical properties for use in the present invention are, in general, water-soluble, solid, non-hygroscopic polyhydric alcohols and non-reducing sugars. Examples of satisfactory diluents are as follows: polyhydric alcohols—sorbitol, mannitol, dulcitol, i-erythritol and i-inositol; sugars—raffinose and sucrose. Other solid, water-soluble non-hygroscopic polyhydric alcohols and non-reducing sugars may be employed.

The products of the present invention should not be confused with colloidal silver bromide and silver halide acacia compositions mentioned in the art. The prior compositions prepared by a reduction process using hydrazine have been found highly acidic and unsatisfactory for antiseptic use. In addition, the prior processes used merely to study colloidal or physical properties of various colloids have also been found unsatisfactory as they fail to produce a solutiton of proper concentration for antiseptic purposes. As far as I have been able to ascertain no one has previously studied the antiseptic properties of the products of the present invention or suggested the same for use in the medical art.

At the present time it is impossible to say whether the unique antiseptic properties of colloidal silver bromide are related to its relatively high light sensitivity as compared to the other silver halides. However, extensive tests have shown the colloidal silver bromide-acacia composition to exhibit definite bactericidal and bacteriostatic effects of the type desired in mild antiseptic agents. The products of the present invention, for example, are non-irritating and possess a superior penetrating action making them particularly adaptable for use on mucous membrane surfaces and the like. In addition, and of great importance, extensive tests have shown the silver bromide-acacia colloid not to lose its antiseptic activity in the presence of blood serum. The silver bromide-acacia compositions with the added diluent dissolve rapidly in water forming solutions relatively more stable than are obtainable using proteins such as gelatin.

It will be understood that the present invention is not limited to the above illustrative examples. All colloidal silver bromide-acacia compositions coming within the scope of the invention are intended to be covered by the claims appended hereto.

I claim:

1. As an antiseptic, colloidal silver bromide-acacia compositions containing a diluent selected from the class consisting of solid, water-soluble, non-hygroscopic polyhydric alcohols and non-reducing sugars.

2. An aqueous antiseptic solution containing a colloidal silver bromide-acacia composition and a diluent selected from the group consisting of solid non-hygroscopic polyhydric alcohols and non-reducing sugars.

3. An antiseptic containing a silver bromide-acacia colloid and about 35 percent of a solid diluent selected from the group consisting of water-soluble non-hygroscopic polyhydric alcohols and non-reducing sugars.

4. As an antiseptic, colloidal silver bromide-acacia compositions containing 20 to 50 percent diluent selected from the group consisting of solid, water-soluble non-hygroscopic polyhydric alcohols and non-reducing sugars, the solid content of said antiseptic being made up of at least about 16 percent colloidal silver bromide.

5. An antiseptic consisting essentially of about 16 percent colloidal silver bromide, about 49 percent acacia and about 35 percent sorbitol as a diluent.

MARLIN T. LEFFLER.